United States Patent [19]

Celette

[11] Patent Number: 4,498,242

[45] Date of Patent: Feb. 12, 1985

[54] DEVICE FOR POSITION-CHECKING OF THE SHOCK-ABSORBER HEADS OF A FRONT VEHICLE SUSPENSION SYSTEM

[75] Inventor: Germain Celette, Vienne, France

[73] Assignee: Celette S.A., Vienne, France

[21] Appl. No.: 536,396

[22] Filed: Sep. 27, 1983

[30] Foreign Application Priority Data

Sep. 30, 1982 [FR] France ............... 82 16439
Sep. 15, 1983 [FR] France ............... 83 14670

[51] Int. Cl.³ .............................................. G01B 5/25
[52] U.S. Cl. ........................ 33/180 AT; 33/181 AT; 33/288
[58] Field of Search ............ 33/180 AT, 181 AT, 288

[56] References Cited

U.S. PATENT DOCUMENTS

| | | | |
|---|---|---|---|
| 4,242,803 | 1/1981 | Dory | 33/288 |
| 4,302,883 | 12/1981 | MacGregor | 33/288 |
| 4,319,402 | 3/1982 | Martin | 33/181 AT |
| 4,321,754 | 3/1982 | Colby | 33/288 |
| 4,329,784 | 5/1982 | Björk | 33/180 AT |

*Primary Examiner*—Willis Little
*Attorney, Agent, or Firm*—August E. Roehrig, Jr.

[57] ABSTRACT

The device for checking the positions of shock-absorber heads of a McPherson suspension system comprises a horizontal cross-beam which is placed above the front end of a damaged or undamaged vehicle body to be checked and which is pivotally mounted on two lateral support brackets. Two sliders mounted on the cross-beam each carry a pivoted control arm, the lower end of which is placed opposite to the center of the corresponding shock-absorber head. Graduated scales placed above each slider and on each control arm provide a direct visual indication of forward or backward angular displacement of the cross-beam with respect to the lateral support brackets and of outward or inward inclination of the control arms of the sliders.

13 Claims, 4 Drawing Figures

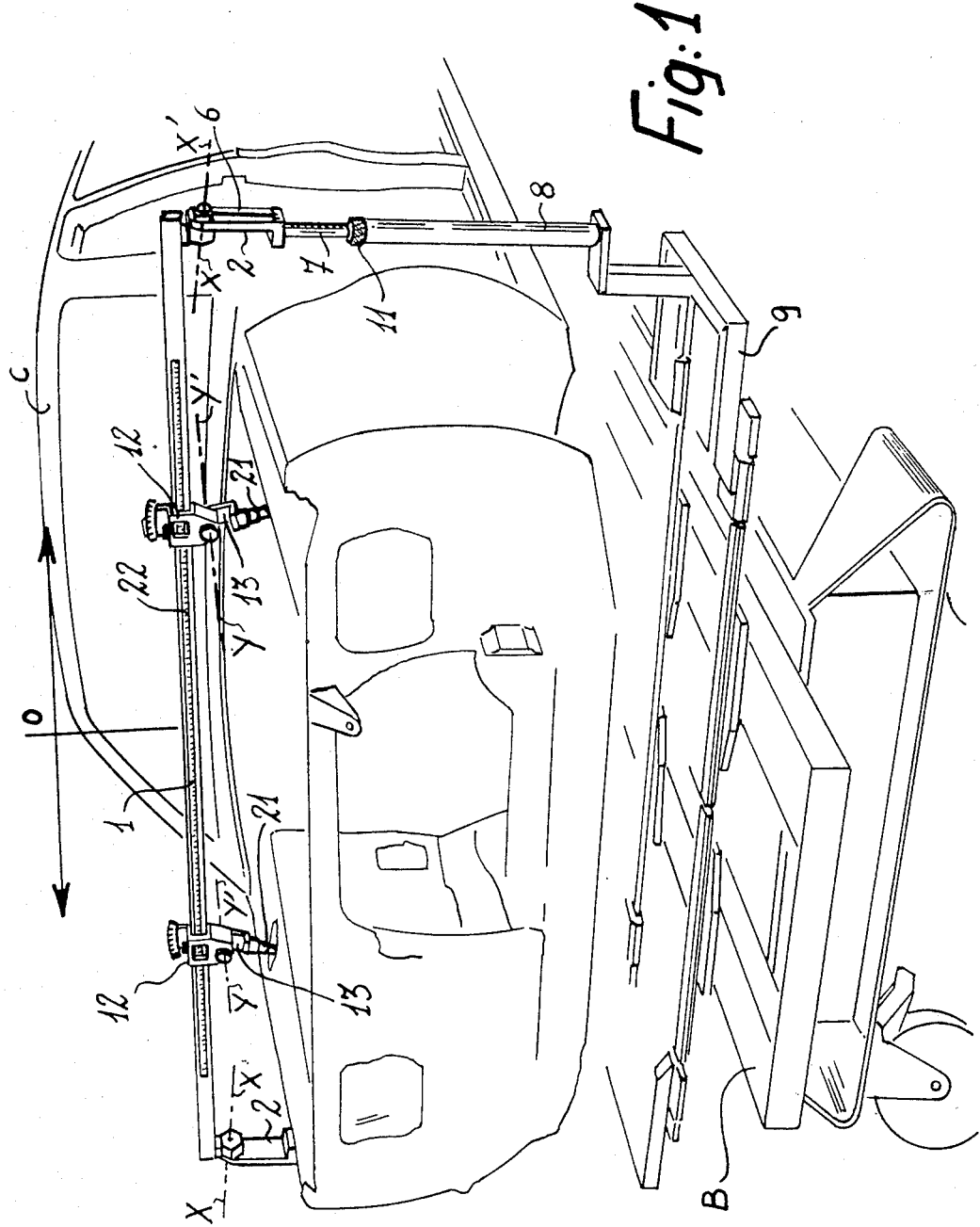

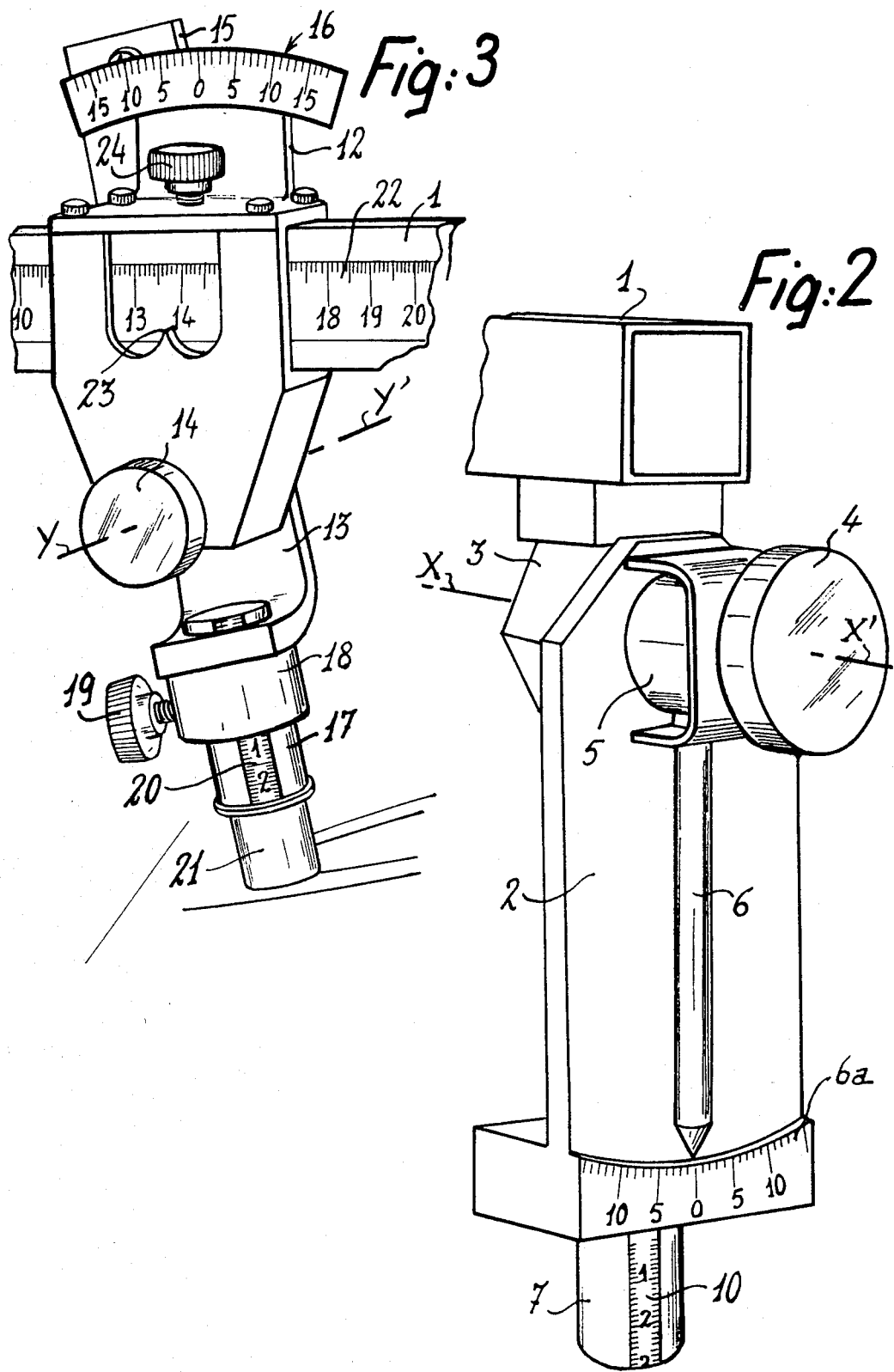

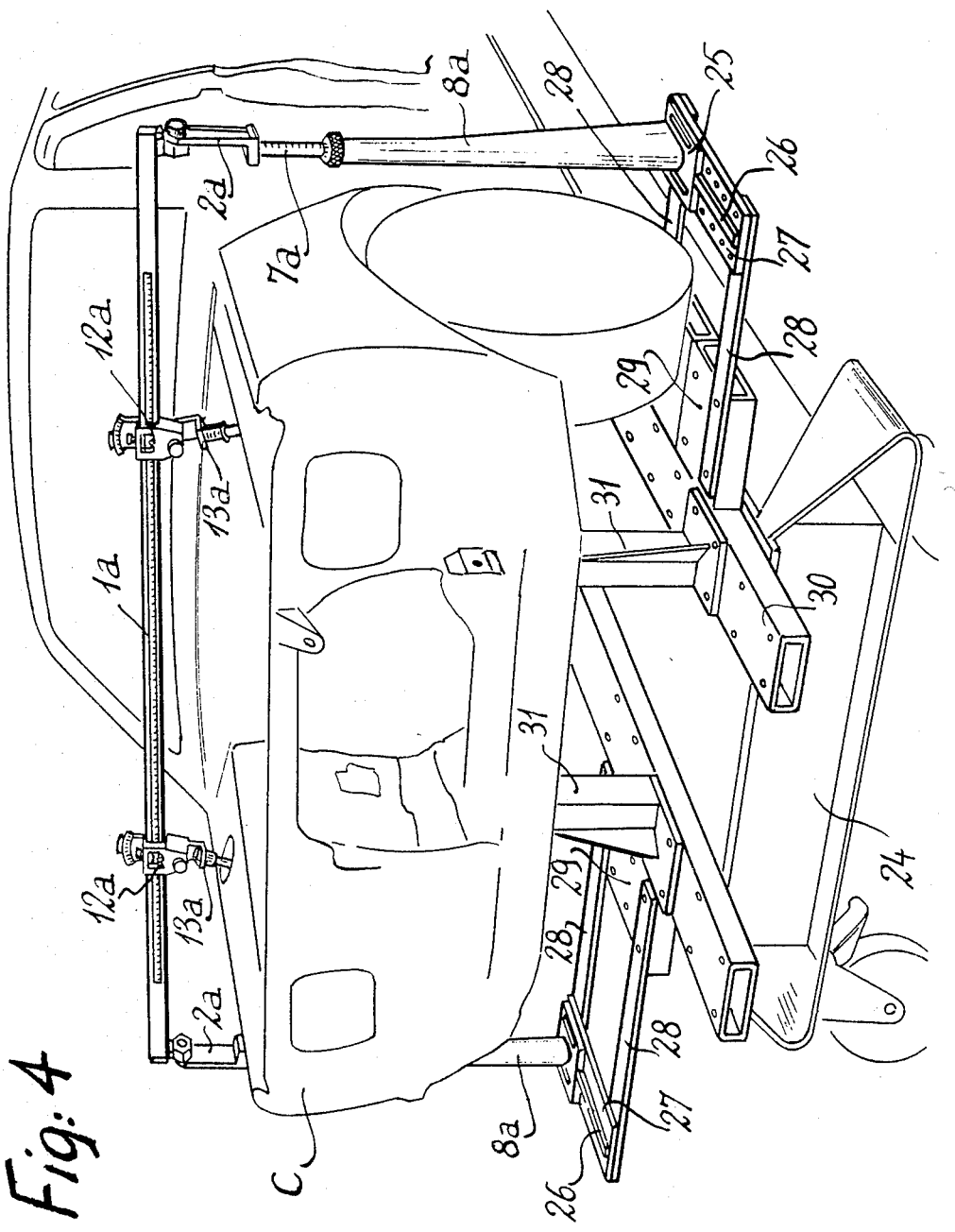

DEVICE FOR POSITION-CHECKING OF THE SHOCK-ABSORBER HEADS OF A FRONT VEHICLE SUSPENSION SYSTEM

This invention relates to position-checking of the shock-absorber heads of a front suspension system of the McPherson type with respect to the body of a damaged vehicle.

A checking operation of this type is of major importance since the value of the real camber angle and caster angle is directly related to the positions of the shock-absorber heads. It is for this reason that, when undertaking body repairs in the case of a vehicle equipped with a suspension system of the McPherson type, it is essential to determine the real positions of the corresponding shock-absorber heads.

Up to the present time, however, this checking operation had been performed with relatively low accuracy, for example by providing a makeshift framework mounted above the front end of the vehicle body in order to endeavor to determine the real positions of the corresponding shock-absorber heads. This operation was inconvenient in practice, especially as it proved necessary to measure a certain number of distances with respect to predetermined fixed points and to perform a number of calculations in order to obtain the desired values.

For the reason just stated, the object of the invention is to provide a device which permits direct reading of the two values to be determined, that is to say on the one hand the angle of relative forward or backward displacement of the position of each front shock-absorber head and, on the other hand, the angle of relative outward or inward inclination of the same shock-absorber head. Moreover, said device is not only of very simple design but is also very convenient to use.

To this end, the device under consideration comprises:

on the one hand a horizontal cross-beam which is intended to be placed above the front end of the vehicle to be checked and the ends of which are mounted so as to be capable of pivotal displacement about two transverse horizontal axes carried by two lateral support brackets;

on the other hand two sliders slidably mounted on said cross-beam and each adapted to carry a control arm which is capable of pivotal displacement about an axis disposed in the longitudinal direction and the lower end of which is intended to be placed opposite to the center of the head of either of the two corresponding shock-absorbers;

separate graduated scales which make it possible after this coincident position-setting operation to determine the angle of relative forward or backward displacement of the cross-beam with respect to its lateral support brackets as well as the angle of outward or inward inclination of the control arms of the sliders.

In accordance with another distinctive feature of the device according to the invention, the lateral support brackets of the horizontal cross-beam are adapted to be mounted on vertical columns forming part of a vehicle-body checking frame or bench jig and each support bracket is provided with a graduated scale, a pointer carried by the horizontal cross-beam being capable of moving opposite to said graduated scale in order to permit direct reading of the angle of forward or backward relative displacement of said cross-beam.

In regard to the sliders which are slidably mounted on the horizontal cross-beam, each slider is in turn provided with a graduated scale, a pointer carried by the corresponding control arm being capable of moving opposite to said graduated scale in order to permit direct reading of the angle of outward or inward inclination of said control arm.

Other features of the invention will be more apparent to those skilled in the art upon consideration of the following description and accompanying drawings, wherein:

FIG. 1 is a view in perspective showing the device in accordance with the invention when in use on a vehicle body;

FIG. 2 is a view in perspective to a different scale showing the mode of assembly of one of the ends of the horizontal cross-beam on the corresponding lateral support bracket;

FIG. 3 is a view in perspective to a different scale showing one of the sliders carried by the horizontal cross-beam of the device under consideration;

FIG. 4 is a view in perspective showing another embodiment of the device in accordance with the invention.

As mentioned earlier, the device comprises a horizontal cross-beam 1 which is intended to be placed above the front end of a damaged vehicle body C, said body being fixed on a checking frame or bench jig B. At each end, the horizontal cross-beam is pivotally mounted on a lateral support bracket 2. For this purpose each end of said cross-beam is rigidly fixed to lower members 3 which are mounted so as to be capable of pivotal displacement about a transverse horizontal axis X—X' carried by the corresponding support bracket. A knurled knob 4 is provided for limiting the freedom of pivotal displacement of the cross-beam 1 or for locking this latter in the desired position.

A sleeve 5 rigidly fixed to the member 3 is adapted to carry a pointer 6, the lower end of which is placed opposite to a graduated scale 6a provided on the corresponding lateral support bracket 2. A vertical rod 7 extending downwards from each support bracket is adapted to be engaged within a column 8 carried by mounting members 9 which are fixed on the bench jig B. The rod 7 is capable of sliding within the interior of the column 8, thus making it possible to adjust the height of the cross-beam 1 at will. A graduated scale 10 is carried by the rod 7 for adjustment purposes whilst a locking ring 11 is fitted on the column 8.

The horizontal cross-beam 1 is adapted to carry two sliders 12 and each slider is provided with a pivoted control arm 13. Each arm is pivotally suspended from the corresponding slider and is capable of pivotal displacement about an axis Y—Y' disposed in the longitudinal direction. A knurled knob 14 serves to limit this freedom of pivotal displacement or to lock the corresponding control arm in the desired position.

Each control arm 13 is provided at one end with a pointer 15 which moves opposite to a graduated scale 15 of arcuate shape and provided on the corresponding slider 12.

The lower end of each control arm is adapted to carry a piston 17 which is slidably mounted within a sleeve 18 and which can be fixed in position by means of a knurled knob 19, a graduated scale 20 being provided for determining the exact position of the piston. The lower end of said piston is adapted to carry a positioning member 21 in which a recess can be formed in order to fit said member with high precision over the head of one of the shock-absorbers of a McPherson suspension system.

The horizontal cross-beam 1 is provided with a double graduated scale 22, the zero point of which is located at the center. This graduated scale is intended to permit adjustment of the positions of the sliders 12. To this end, each slider is provided with a pointer 23 placed opposite to said graduated scale and with a knurled knob 24 which serves to lock the slider in the desired position.

In order to check the real position of each head of the front shock-absorbers of a suspension system of the McPherson type on a damaged vehicle body, it is necessary to place the mounting supports 9 of the vertical columns 8 in the positions mentioned on the dimension card corresponding to the type of vehicle to be checked. It is then only necessary to displace the cross-beam 1 in either the forward or backward direction and to cause a pivotal displacement of the control arms 13 either inwards or outwards until the detection members 21 are in contact with the corresponding shock-absorber heads. When these elements have thus been brought into coincident relation, the angles to be measured can be read directly, respectively on the graduated scales of the lateral support brackets 2 and the graduated scales of the sliders 12.

The value of the angle of relative forward or backward displacement of the cross-beam 1 is in fact read directly on the graduated scales of the lateral support brackets, thus permitting immediate determination of the angle relative to the caster angle. Moreover, it is then possible to determine the angles of inward or outward inclination of the control arms 13 on the graduated scales 16 of the sliders, which immediately indicates the angle relates to the camber angle. As can readily be understood, the double graduated scale 22 provided on the cross-beam 1 makes it possible to place the sliders 12 in the requisite positions indicated by the technical card corresponding to the vehicle to be checked.

It is worthy of note that positioning of the detection members 21 against the heads of the corresponding shock-absorbers can be very readily performed either by means of a downward displacement of the moving system consisting of the cross-beam 1 and its lateral support brackets after preliminary lifting of said moving system, or by means of a temporary withdrawal of the movable pistons 17 at the moment of positioning of the checking device.

The conclusion which emerges from the foregoing considerations is that the angles relating to camber and caster on a damaged vehicle body or even an undamaged body can be determined very rapidly and without any calculation by means of the device in accordance with the invention. This accordingly constitutes an essential advantage of this device over the measuring systems employed up to the present time.

FIG. 4 illustrates another embodiment of the device in accordance with the invention which is specially designed to check the position of the heads of shock-absorbers of the McPherson type on a bench jig which is employed more generally for checking vehicle bodies, thereby ensuring that the shock-absorber checking operation is not performed in a virtually independent manner but in close conjunction with checking of the other points of a damaged vehicle body.

This device is similar to that described earlier. In consequence, it comprises a horizontal cross-beam 1a which is intended to be placed above the front end of the body C of a damaged vehicle. In the embodiment described earlier, said cross-beam carries two sliders 12a and each slider is provided with a pivoted control arm 13a. It may indeed be noted that the arrangement of this cross-beam and of the sliders thus provided is exactly the same as in the previous embodiment.

In point of fact, the device now under consideration differs from the previous embodiment solely in the fact that the lower rods 7a of the lateral support brackets 2a of the cross-beam 1a are carried by two columns 8a, said columns being associated with means which serve to fix these latter directly on a bench jig 24 for checking and/or repairing the vehicle body. This bench jig is advantageously of the type described in French Pat. No. 78 11833 filed by the Applicant Company on Apr. 21st, 1978.

To this end, the columns 8a are each provided at the lower end with a shoe 25 which is slidably mounted on a longitudinal guide 26 provided on a horizontal sole-plate 27 carried by a support which is adapted to be fixed on the corresponding bench jig 24. Each support can be constituted by two parallel horizontal arms 28 which are intended to be placed in the transverse direction and one end of which carries the corresponding sole-plate 27 whilst the opposite ends are adapted to be fixed on side-extension members 29 provided near the front ends of the longitudinal members 30 of the bench jig 24.

In addition, said bench jig is fitted with a set of jig brackets which are specially designed so that the vehicle body C to be checked can be rigidly fixed to the bench jig. Thus the longitudinal members 30 of said bench jig are provided at their front ends with brackets 31 which are intended to be fixed on predetermined points of the front portion of the vehicle body C, a pair of similar fastening brackets being provided at the rear end in order to be fixed on two other predetermined points of said vehicle body. Furthermore, as described in French Pat. No. 78 11833 cited earlier, said bench jig is equipped with a certain number of other accessories for checking the exact position of a series of predetermined points of the vehicle body to be checked.

Under these conditions, the device in accordance with the invention makes it possible to check the position of the shock-absorber heads of a front suspension system of the McPherson type, no longer in an "independent" manner but in direct relation with the checking of all the other check points of a damaged vehicle body. This permits much more accurate and effective checking than is the case with checking performed independently of the other points to be checked.

A point worthy of note is that, during checking operations, it is possible to displace the lateral columns 8a in the longitudinal direction by sliding the shoes 25 of said columns along the sole-plates 27 provided on each side of the bench jig. However, the conditions of use of the device in accordance with the invention are otherwise exactly the same as in the case of the embodiment described earlier.

What is claimed is:

1. A device for checking the positions of shock-absorber heads of a front vehicle suspension system of the McPherson type, wherein said device comprises:
   a horizontal cross-beam which is intended to be placed above the front end of the vehicle to be checked and the ends of which are mounted so as to be capable of pivotal displacement about a transverse horizontal axes defined by two lateral support brackets;

means cooperating with the lateral support brackets for supporting said cross-beam;

two sliders slidably mounted on said cross-beam and carrying a control arm which is capable of pivotal displacement about an axis disposed in the longitudinal direction and the lower end of which is intended to be placed opposite to the center of the head of either of the two corresponding shock-absorbers;

separate graduated scales which make it possible after this coincident position-setting operation to determine the angle of relative forward or backward displacement of the cross-beam with respect to its lateral support brackets as well as the angle of outward or inward inclination of the control arms of the sliders.

2. A checking device according to claim 1, wherein means for cooperating with the lateral support brackets comprise vertical columns forming part of a vehicle-body checking frame or bench jig and each support bracket is provided with a graduated scale, a pointer carried by the horizontal cross-beam being capable of moving opposite to said graduated scale in order to permit direct reading of the angle of relative forward or backward displacement of said cross-beam.

3. A checking device according to claim 1, wherein the sliders which are slidably mounted on the horizontal cross-beam are each provided with a graduated scale, a pointer carried by the corresponding control arm being capable of moving opposite to said graduated scale in order to permit direct reading of the angle of outward or inward inclination of said control arm.

4. A checking device according to claim 1, wherein the lower end of the pivoted control arm carried by each slider is fitted with a sliding piston which can be withdrawn upwards at the time of positioning of the assembly.

5. A checking device according to claim 1, wherein the horizontal cross-beam is provided with a double graduated scale having a central zero point, each slider being provided with a pointer for detecting the position of said slider on said cross-beam.

6. A checking device according to claim 1, wherein the means cooperating with the lateral support brackets comprise two columns each provided at the lower end with a shoe slidably mounted on a longitudinal guide provided on a sole-plate carried by a support, said support being adapted to be fixed on either one side or the other of a bench jig used for checking and/or repairing a vehicle body.

7. A checking device according to claim 6, wherein the support of each horizontal sole-plate has two parallel horizontal arms which are intended to be placed in the transverse direction, the corresponding sole-plate being fixed on one end of each arm whilst the opposite end of said arm is intended to be fixed on the respective side of a bench jig for checking and/or repairing a vehicle body.

8. A checking device according to claim 6, wherein said device comprises in combination a bench jig for checking and/or repairing a vehicle body, the longitudinal members of said bench jig being each provided near the front ends thereof with side extensions for receiving the arms which support the horizontal sole-plates aforesaid, said sole-plates being in turn intended to support the vertical columns of said device.

9. An apparatus for checking the dimensional relationship between various points on a vehicle comprising a horizontally-extending dimensional-indicia-bearing cross beam positionable adjacent a vehicle to be checked and extending transversely across a portion thereof, vertically extending cross-beam support means for supporting the ends of said horizontally-extending cross-beam and having a dimensional-indicia-bearing outer end, said cross-beam support means being fixedly secured at a predetermined position relative to the vehicle to be checked, said outer end of said vertically-extending cross-beam support means and the outer end of said dimensional-indicia-bearing cross beam being connected for selective pivotal positioning of said horizontally-extending cross-beam relative to said vertically-extending cross-beam support means to determine the relative forward or backward angular relationship of said cross-beam to said vertically-extending cross-beam support, and measuring means carried by said horizontally-extending cross-beam for sliding movement therealong, said measuring means including a slider positionable along said cross-beam and a control arm pivotally supported from said slider for selective pivotal positioning of said control arm into contact with a vehicle portion to determine the angle of outward or inward inclination thereof relative to said horizontally-extending cross-beam.

10. The apparatus of claim 9, wherein said dimensional-indicia-bearing outer end of said vertically-extending cross-beam support includes a graduated scale and an end of said horizontally-extending cross-beam includes a pointer carried thereon in a position to move across said graduated scale permitting direct reading of the angle of relative forward or backward displacement of said cross-beam.

11. The apparatus of claim 9, wherein said slider is slidably mounted on said horizontal cross-beam and includes a graduated scale and said control arm includes a pointer positioned to move across said graduated scale in order to permit direct reading of the angle of outward or inward inclination of said control arm.

12. The apparatus of claim 9, wherein said pivotal control arm includes a sliding indicia-bearing piston movable outwardly or inwardly relative to said control arm.

13. The apparatus of claim 9, wherein the indicia on said horizontal cross-beam comprises a double graduated scale having a central zero point, and said slider includes a pointer for indicating the position of said slider on said cross-beam.

* * * * *